United States Patent [19]

Athey

[11] 3,976,409

[45] Aug. 24, 1976

[54] TIRE CURING PRESS CENTER MECHANISM

[75] Inventor: John E. Athey, Akron, Ohio

[73] Assignee: McNeil Corporation, Akron, Ohio

[22] Filed: Nov. 7, 1974

[21] Appl. No.: 521,924

[52] U.S. Cl. .................................. 425/48; 425/33
[51] Int. Cl.² ...................... B29H 5/02; B29H 5/06
[58] Field of Search ................... 425/33, 38, 48, 52, 425/58

[56] References Cited
UNITED STATES PATENTS

| | | |
|---|---|---|
| 2,495,664 | 1/1950 | Soderquist ............................. 425/33 |
| 2,699,572 | 1/1955 | Soderquist ............................. 425/33 |
| 2,730,763 | 1/1956 | Brundage ............................... 425/33 |
| 2,775,789 | 1/1957 | Soderquist ............................. 425/33 |
| 2,808,618 | 10/1957 | Soderquist ............................. 425/33 |
| 3,396,221 | 8/1968 | Balle et al. ........................ 425/52 X |

*Primary Examiner*—J. Howard Flint, Jr.
*Attorney, Agent, or Firm*—Hamilton, Renner & Kenner

[57] ABSTRACT

A center mechanism for a press for shaping and curing tires having a center post carrying an upper bladder clamp, a distensible bladder is secured to the upper bladder clamp and a lower bladder clamp such that a chamber for circulating curing medium is formed within the bladder, the center post moves relative to a lower bead ring for supporting the lower bead of an uncured tire, the lower bead ring being attached to the lower bladder clamp, and a cylinder mechanism positions the post such that the upper bladder clamp is opposite the upper bead of an uncured tire band when supported by a loading mechanism and when the press is closed about the uncured tire.

15 Claims, 6 Drawing Figures

TIRE CURING PRESS CENTER MECHANISM

BACKGROUND OF THE INVENTION

The present invention relates to apparatus for utilization in presses for shaping and curing tires. More particularly, the present invention relates to apparatus for positioning an uncured tire relative to a press for shaping and curing tires wherein the uncured tire is positioned and manipulated by a unique bag control or center mechanism configuration. More specifically, the invention relates to apparatus for processing an uncured tire in a tire shaping and curing press in which a unique form of diaphragm type center mechanism is employed in a manner which may be particularly advantageous in conjunction with the processing of radial tires.

Although numerous types of presses for shaping and curing tires have been developed over the years, the most universally acceptable have employed center mechanisms which utilize a flexible, generally cylindrical bladder or diaphragm member which is secured to the press and is capable of being radially distended within an uncured tire band in order to apply shaping pressure and curing pressure and heat to the interior surface of the tire band. The inventor's assignee has pioneered in the development of numerous forms of such tire shaping and curing presses and manufactures the wellknown and highly regarded press sold under the trademark "Bag-O-Matic".

Radial tires have met with substantial success abroad for many years and have been gaining increased acceptance domestically over the past few years. Radial ply tires as well as belted/bias ply tires both incorporate an annular, inextensible breaker ply or belt that extends circumferentially of the carcass beneath the tread ply. Tires of such configuration normally are not built in the cylindrical form of a conventional bias ply tire, which was the industry standard for many years, because of the inextensible nature of the breaker ply employed in such tires. Rather, the carcass must be at least partially pre-shaped before the breaker ply is positioned and affixed. In such pre-shaped uncured tire bands the bead forming portions are therefore necessarily in closer axial proximity to each other in that the pre-shaped tire band approximates to some extent the configuration of a cured tire as contrasted with the substantially cylindrical configuration of conventional bias ply tires. Therefore, the bead to bead dimension interiorly of such a preformed tire substantially exceeds the axial distance between the beads. Accordingly, a bladder or diaphragm member which has an axial extent that approximates the bead to bead dimension interiorly of a tire will when axially extended to receive the tire thereover project a substantial distance above the upper bead of the tire.

In early industry experience with the insertion of a bladder in such a pre-shaped tire band substantial difficulty was encountered in that either the bladder or the upper bead of the tire or both were critically damaged. This problem was solved in a manner and employing apparatus which has become substantially industry standard as disclosed in U.S. Pat. No. 2,997,738.

Recently, the industry has evidenced an interest in increasing pressure and temperature characteristics of the curing medium inserted in the bladder due to considerations of construction and constitution of pre-shaped uncured tire bands and for purposes of reducing the cure time, thereby increasing press productivity.

The manipulation of the bladder and related center mechanism components in most prior art presses has been accomplished hydraulically, i.e., by one or more hydraulic cylinders positioned within the press proximate the center mechanism components. Inasmuch as water is chemically neutral to the exposed components of a tire as well as the elastomer, normally rubber, from which the bladder is made it is most commonly employed as the hydraulic fluid. The use of water as the hydraulic fluid is advantageous with respect to many operational considerations of a cylinder and is otherwise most satisfactory so long as the seal between the cylinder and the interior of the bladder effectively precludes any leakage. However, if the water or other hydraulic fluid from the cylinder does penetrate into the bladder, as, for example, when the bladder is extended to effect removal of a cured tire, the residual heat of the center mechanism components from the previous curing cycle is sufficient to cause the water to flash into steam which tends to inflate or radially puff out the bladder. Such radial expansion may be sufficient to impede removal of a cured tire or the positioning of an uncured tire band such as to cause damage to either the tire or press components. Another critical time is during the shaping of the uncured tire band when a relatively low pressure fluid, normally steam, is inserted in the diaphragm and radial puffing or pressure fluctuation may cause improper seating of the bladder in the uncured tire band.

Another problem may be encountered during the final cure of the tire under the above-mentioned increased pressure and temperature conditions wherein high pressure water is employed as the curing medium. The penetration of the curing medium through the seals into the operating cylinder can result in contamination of the hydraulic fluid in a cylinder which eventually produces operational difficulties.

Although mechanical arrangements have been proposed to eliminate the use of a cylinder in proximity with the bladder, such devices tend to substantially increase the complexity of the center mechanism configuration, require additional space, reduce the operating flexibility with respect to other features which may be provided and have otherwise proved to be unacceptable.

SUMMARY OF THE INVENTION

Therefore, an object of the present invention is to provide a tire curing press center mechanism which is capable of meeting the processing requirements for radial tires. Another object of the invention is to provide a press center mechanism which is capable of operating in conjunction with numerous existing tire loading and unloading devices without the necessity for modification thereto. A further object of the present invention is to provide a press center mechanism which is capable of use in a variety of existing presses without redesign or modification and without limiting the presence of other operating components and features.

Still another object of the invention is to provide a press center mechanism having a bladder which can be introduced into an uncured tire band without damage to either the bladder or the tire band and symmetrically positioned therein. A further object of the invention is to provide a press center mechanism wherein the bladder may be readily replaced in the event tires of a different size are to be processed in the press or in the event of bladder failure. Yet another object of the invention is to provide a press center mechanism which may be used in conjunction with either conventional two-piece or segmented molds.

Yet a further object of the invention is to provide a press center mechanism wherein the bladder and related center mechanism components are operated by hydraulic cylinders, which has proven advantageous, while separation of the hydraulic fluid for the cylinders and the curing medium inserted into the bladder is assured, thereby eliminating the above enumerated operational difficulties which can be caused by the commingling of these fluids. Still another object of the invention is to provide a press center mechanism which minimizes the mechanical components within the bladder which can interfere with or damage the bladder. A still further object of the invention is to provide a press center mechanism which is of relatively simple construction, which can provide a cure cycle and a tire loading and unloading cycle which equals or exceeds most prior art devices, and which can be constructed for operational reliability comparable with prior art devices.

These and other objects, together with the advantages thereof over existing and prior art forms which will become apparent from the following specification, are accomplished by the means hereinafter described and claimed.

In general, a center mechanism for a press for shaping and curing tire bands embodying the concept of the present invention employs a distensible bladder which is secured to upper and lower bladder clamp rings such that a chamber for circulating curing medium is formed within the bladder, a lower bead ring for supporting the lower bead of an uncured tire which is attached to the lower bladder clamp ring, a center post which moves relative to the lower bead ring and which is attached to the upper bladder clamp ring, and a cylinder mechanism which positions the post such that the upper bladder clamp ring is opposite the upper bead of an uncured tire band when supported by the upper bead by a loading mechanism and when the press is closed about the uncured tire. The cylinder mechanism may include a piston connected to the center post and operative in a chamber of a cylinder casing which is separated by seals from another chamber in the cylinder casing which communicates with the chamber formed within the bladder for curing medium.

DESCRIPTION OF THE PREFERRED EMBODIMENT

Figure 1:
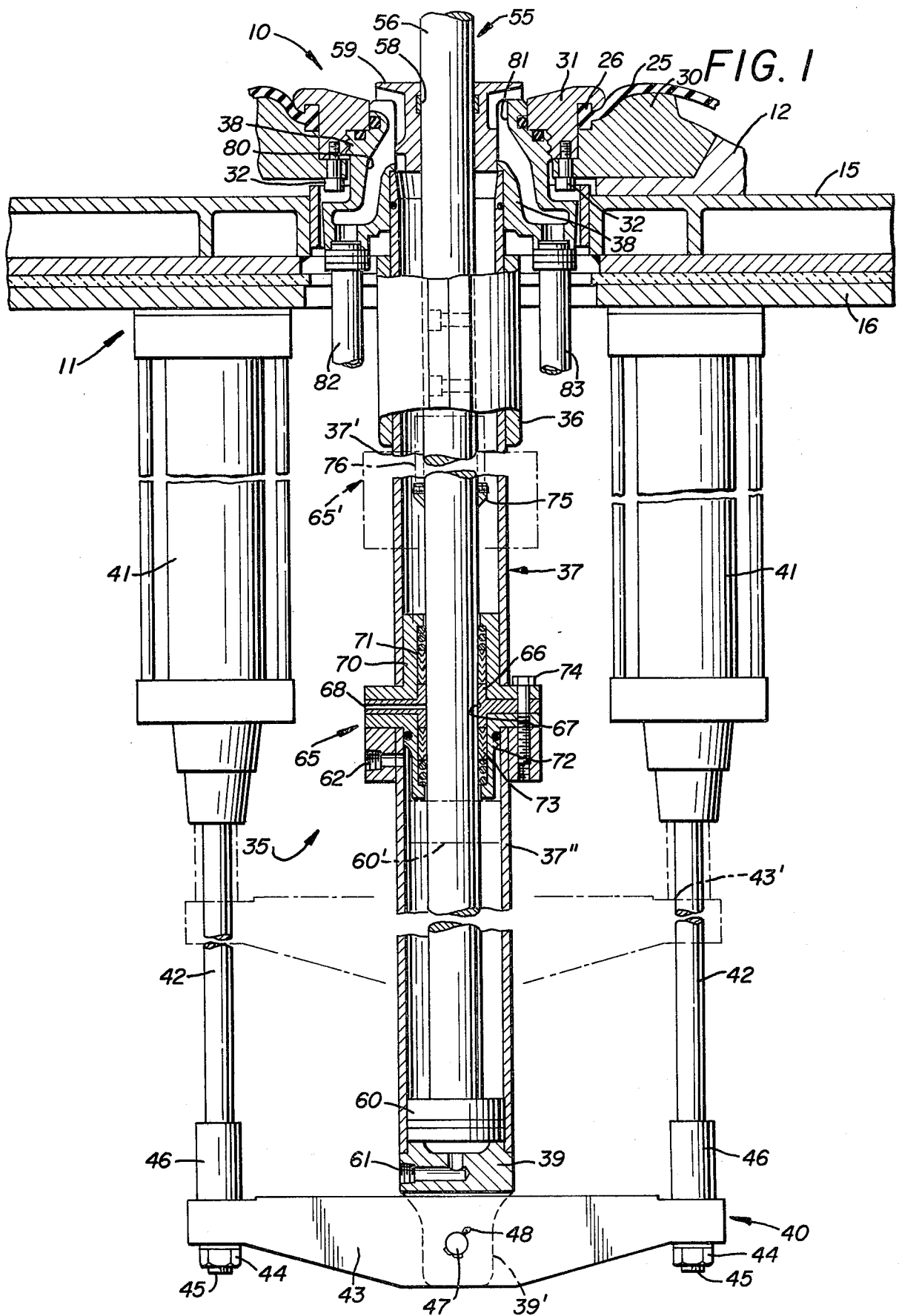
FIG. 1 is a fragmentary vertical view partially in cross-section depicting a portion of a press for shaping and curing tires and equipped with a center mechanism embodying the concepts of the present invention.

A center mechanism according to the concept of the present invention, as generally indicated by the numeral 10 in the attached drawings, may be incorporated in various types and constructions of presses designed to shape and cure tires. A press of the general type disclosed in prior U.S. Pat. No. 3,336,635 and the references therein owned by applicant's assignee constitutes one example of a suitable press.

Referring now to the drawings, a portion of a suitable press, generally indicated by the numeral 11, is shown in sufficient detail for an understanding of the structure and operation of the center mechanism 10. The press 11 is depicted as mounting separable lower and upper, mating mold sections 12 and 13, respectively, the latter being depicted in FIGS. 4 and 5. It should be appreciated that the center mechanism 10 is equally suitable for use in conjunction with a press mounting the more complex segmented mold sections or adapted to mount both types of mold sections.

The lower mold section 12 is mounted on a platen 15 secured to a bed plate 16 constituting a portion of the base of the press 11. The upper mold section 13 is preferably similarly mounted on a platen (not shown) which is selectively movable with respect to the platen 15. Suitable press components for effecting movement of the upper mold section 13 relative to the lower mold section 12 are described in the above identified U.S. Pat. No. 3,336,635 and the references therein. However, other forms of press operating mechanisms known to persons skilled in the art may be employed so long as sufficient clearance is provided when the press is open such that an uncured tire band B and a loading apparatus, generally indicated by the number 20 in FIGS. 2 and 3, may be positioned in operative relation to the center mechanism 10. Although various uncured tire band loading devices are known to the art which might be employed, the preferred loading apparatus 20 is depicted as having a plurality of paddle members 21 with a curved shoe portion 22 for engaging the upper bead area of uncured tire band B at circumferentially spaced intervals.

The bed plate 16, platen 15, and lower mold section 12 are centrally apertured to receive the center mechanism 10. The portion of center mechanism 10 extending above the lower mold section 12 includes a flexible bladder, diaphragm or bag 25 which may be made of any of a number of suitable elastomeric materials well known to persons skilled in the art. As shown, the bag 25 is of the type which is open at both ends and is preferably of a generally annular configuration and symmetrical about a horizontal centerline thereof. Further, the bag 25 is preferably of a substantially uniform wall thickness to provide a uniform transmittal of temperature and pressure from internally thereof to all portions internally of an uncured tire band B which it contacts. The wall thickness may be advantageously reduced, as for example on the order of approximately 30%, as compared with the range of thicknesses which have become relatively standard for use with respect to presses of the type manufactured by applicant's assignee as exemplified by the aforementioned U.S. Pat. No. 3,336,635. This has the effect of reducing the temperature transmittal time through the wall of bag 25, facilitating operation according to the structure of the present invention as hereinafter discussed, and producing only minimally deleterious effects with respect to the operating life of the bag, if any.

The bladder or bag 25 has a lower bead area 26 and an upper bead area 27 (FIGS. 1 and 2) which are sealingly clamped in a manner to be described to permit selective radial expansion and contraction of bag 25 upon the introduction of and withdrawal of fluids therewithin. The lower bead area 26 of bag 25 is clamped between a lower bead ring 30, which provides a seat for the lower bead of uncured tire band B, and a lower plate ring 31. In order to permit bladder change for installing a different size bag 25 as for processing uncured tire bands of differing dimensions, the lower bead ring 30 and lower plate ring 31 are detachably secured as by bolts 32.

Figure 6:
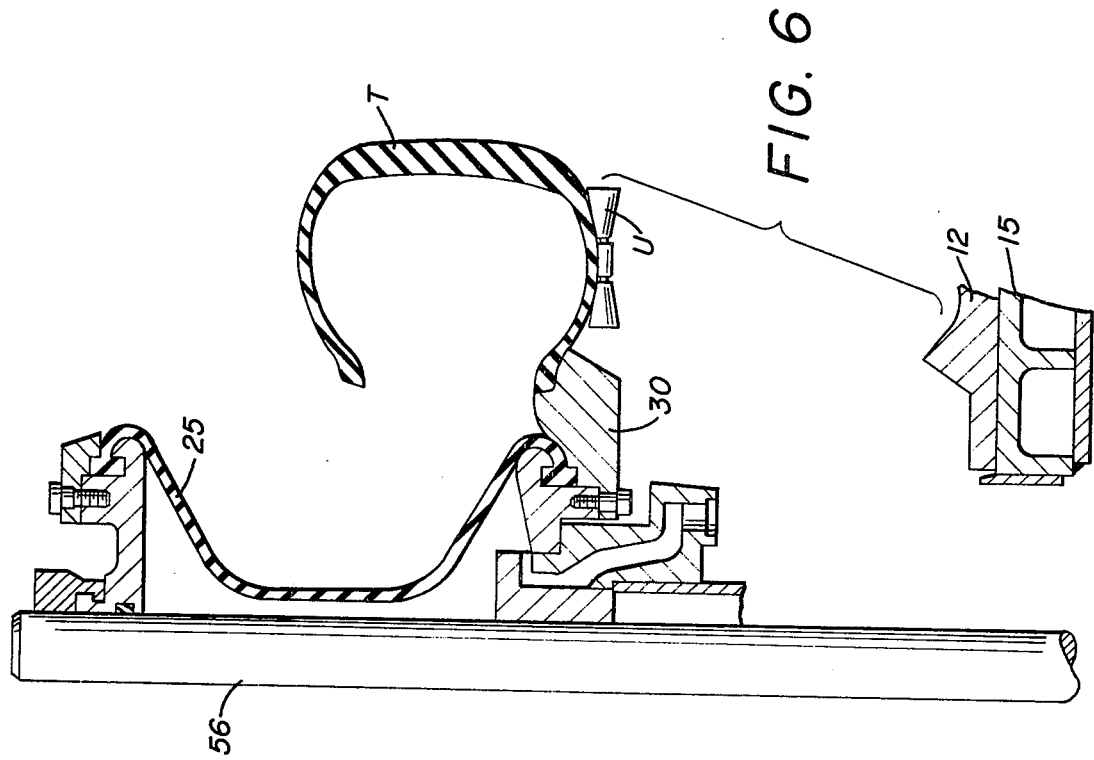
FIG. 6 is a view similar to FIG. 5 but representing the disposition of the center mechanism sequentially after the disposition depicted in FIG. 5 and with lower bead ring mechanism extended upwardly from the lower mold section, an unloader arm disposed under the cured tire, the bladder removed from the tire, and the upper bladder clamping ring extended to its upper position, thereby placing the center mechanism in position for receiving another green tire band upon lowering the center mechanism to its original position, thereby stripping the cured tire from the lower bead ring.

The lower bead ring 30 is selectively positioned in register with the lower mold section 12 as depicted in FIGS. 1-5 or extended thereabove as depicted in FIG. 6 by a cylinder mechanism, generally indicated by the numeral 35 in FIG. 1. The cylinder mechanism 35 has a generally annular housing 36, which is fixed in a central bore in bed plate 16 of the base of press 11, that slidably receives a cylinder casing generally indicated by the numeral 37. The upper end of cylinder casing 37 carries a cap plate 38 which is exteriorly threaded for selective attachment to the interiorly threaded lower plate ring 31.

The vertical actuation of lower bead ring 30 is effected by a cylinder lift assembly, generally indicated by the numeral 40 in FIG. 1. Preferably, the cylinder lift assembly 40 has a pair of drive cylinders 41 which may be attached to bed plate 16 of press 11 on diametrically opposite sides of cylinder casing 37. The cylinders 41 have piston rods 42 which carry a yoke 43 secured thereto by nuts 44 on threaded ends 45 of the rods 42 so that spacers 46 of different axial extent may be positioned above yoke 43 to control the extent of vertical travel of the yoke 43. The cylinder casing 37 has a bottom cap 39 with an extension 39' which is coupled to the yoke 43 as by a pin 47 and cotter key 48 configuration. Thus, the yoke 43 carrying cylinder casing 37 moves between the solid and phantom line 43' positions of FIG. 1 upon selective actuation of the drive cylinders 41 of the cylinder lift assembly 40.

Figure 2:
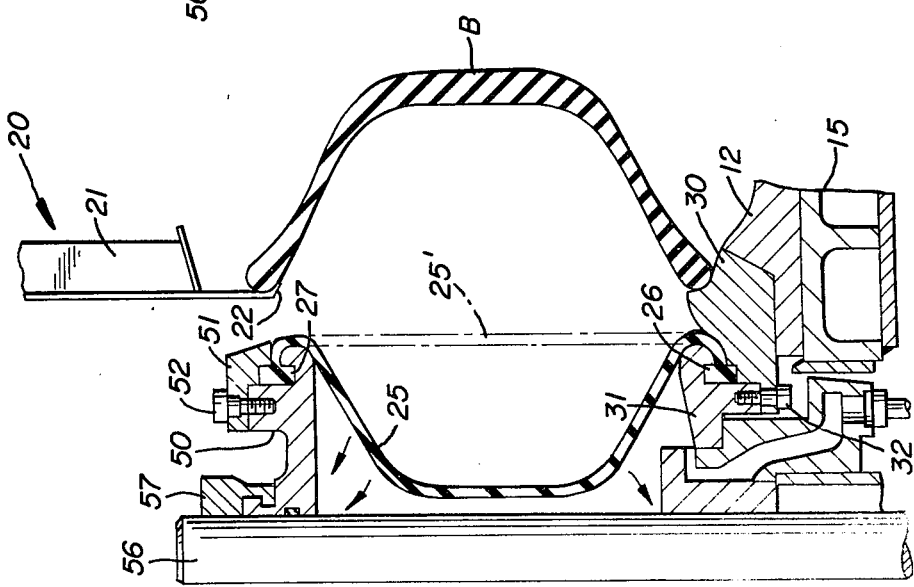
FIG. 2 is a fragmentary view of a portion of FIG. 1, also in section, depicting the center mechanism as an uncured tire band is disposed in juxtaposition thereto by a loading device.

As seen in FIG. 2, the upper bead area 27 of bladder or bag 25 is engaged between an upper plate ring 50 and a cooperating clamp ring 51 which are detachably secured by bolts 52 for bladder change. As shown, the upper bead of tire band B is engaged by a contoured bead engaging portion 13' (FIGS. 4 & 5) of upper mold section 13; however, it should be appreciated that a separate upper bead ring portion might be provided to cooperate with the clamp ring 51 and a modified upper mold section 13. If desired such an upper bead ring configuration could be made selectively extensible from the upper mold section as is depicted for example in U.S. Pat. No. 3,790,656.

Figure 4:
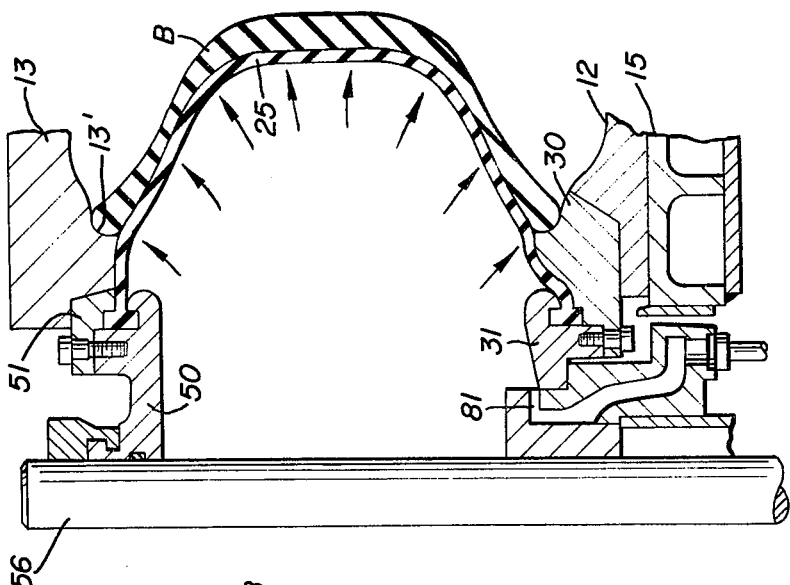
FIG. 4 is a view similar to FIG. 3 representing the disposition of the center mechanism as depicted in FIG. 3 with the loader removed and the press partially closed such that the upper mold section engages the upper bead of the tire.
Figure 5:
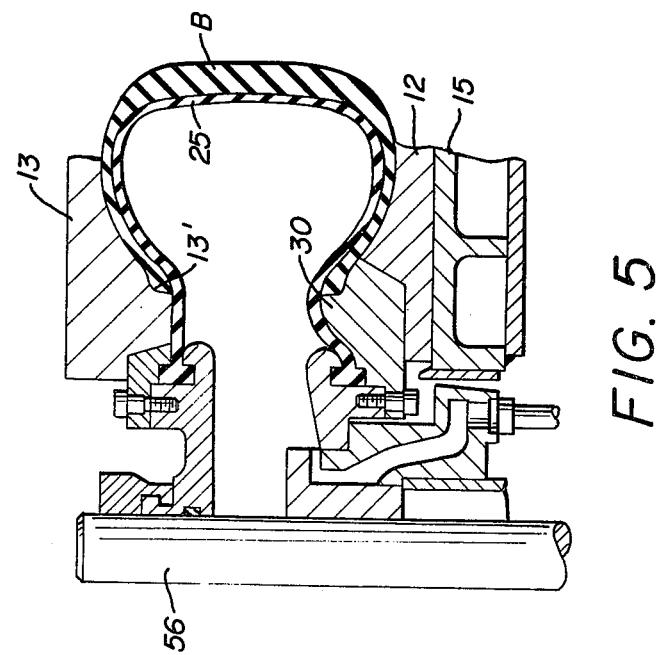
FIG. 5 is a view similar to FIG. 4 but representing the disposition of the center mechanism sequentially after the disposition depicted in FIG. 4 and with the press fully closed and with curing fluid circulating in the bladder.

The upper bead of bag 25 is movable to the extent necessary to provide the variation in bladder bead spacing depicted in FIG. 1-4 as contrasted with FIG. 5 by a cylinder mechanism, generally indicated by the numeral 55. The cylinder mechanism 55 has a piston rod 56 to which the upper clamp ring 51 is selectively axially secured by a rod clamp 57 (FIG. 2). The piston rod 56 extends through and is supported by a rider ring 58 in a gland 59 positioned within the cap plate 38 of cylinder casing 37. The ring 58 serves to protect the gland 59 from undue wear which may be caused by variation in the radial forces applied to piston rod 56 from time to time during the operating cycle. Piston rod 56 further extends through an upper portion 37' of cylinder casing 37 and into a lower portion 37" of cylinder casing 37 wherein it is attached to a piston 60 which moves within the confines of the lower portion 37" of cylinder casing 37.

The upper portion 37' and the lower portion 37" of cylinder casing 37 are joined but maintained in fluid-tight separation by a connector, generally indicated by the numeral 65. As shown, the connector 65 has a central ring 66 having an annular groove 67 communicating with a drain channel 68 therein. Abutting one side of ring 66 is a gland 70 which extends into the upper portion 37' of cylinder casings 37 and contains suitable packing 71 which engages piston rod 56. Abutting the other side of ring 66 is a gland 72 which extends into the lower portion 37" of cylinder casing 37 and contains suitable packing 73 which also engages piston rod 56. According to this advantageous construction, any fluid passing packing 71 or packing 73 is discharged through drain channel 68 to prevent commingling of fluids in the upper portion 37' and the lower portion 37" of the cylinder casing 37. The ring 66 and glands 70, 72 preferably have radial flanges, as shown, which may be detachably secured as by cap screws 74 to facilitate inspection and/or replacement of packing 71, 73 in the event it becomes defective.

The piston 60 is positioned between its lower solid line position and its upper phantom line position in the lower portion 37" of cylinder casing 37 by the ingress and egress of operating fluid through a bore 61 in the bottom cap 39 and a bore 62 proximate the connector 65. Preferably the fluid is water or other hydraulic fluid which is suitably constituted using any of a number of components well known to persons skilled in the art. If it is desired to limit the upward travel of piston 60 to avoid mechanical interference between piston rod 56 and an unloader or for other reasons, such may be conveniently accomplished by providing an annular ledge 75 on piston rod 56 within the upper portion 37' of cylinder casing 37 at a point at or below gland 59 of cap plate 38 equal to the normal distance of travel of piston 60. The insertion of a cylindrical sleeve 76 about piston rod 56 on ledge 75 will thus reduce its travel to the extent of the axial length of such a sleeve.

The cap plate 38 of cylinder casing 37 is provided with passages 80 and 81, the upper ends of which communicate with the space between the clamped beads of the bag 25 and hence with the interior of the bag. The ingress and egress of fluids through these passages, one normally being an inlet and the other a drain for suitable circulation, provide the shaping and curing fluids for positioning an uncured tire band against the tire mold and supplying the pressure and temperature internally thereof which are requisite to effect an optimum cure in minimum time. The passage 80, 81 may be serviced with suitably conditioned fluids by inlet pipes 82 and 83 set in the lower ends of passages 80, 81, respectively. The design of suitable controls to effect an optimum usage and timing of the various fluids which may be employed is effected by numerous variables, the analysis and compensation for which is well within the capabilities of a person skilled in the art.

It is significant to note that the upper portion 37' of cylinder casing 37 fills with curing medium, since no sealing components are provided in gland 59 of cap plate 38. Attempts to effect such sealing have proven to be unsatisfactory due to lateral forces imparted to piston rod 56 during the operating cycle and the high temperature of the curing medium, which may be on the order of 400°F., both of which are deleterious to the effectiveness and longevity of sealing member components. According to the concept of the present invention the positioning of the sealing members in the connector 65 which is displaced from the cap plate 38 reduces the effect of lateral forces which may be applied to the piston rod 56 in the area of the bag 25. In addition, the curing medium in the upper portion 37' of cylinder casing 37 has little tendency to circulate with the fluids flowing in and out of the bag 25. As a result, this fluid column tends to serve as a buffer zone providing fluid insulation between the high temperature fluid in the bag 25 during the cure operation and the sealing components in connector 65. Therefore, the temperature of the fluid in the upper portion 37' of cylinder casing 37 does not reach the extreme high temperature of the cure fluid but rather fluctuates about a lesser temperature, thereby reducing the otherwise damaging effects of high temperature fluid on the sealing components.

An exemplary operation of a center mechanism 10 in accordance with the concepts of the present invention is depicted by the sequence of operation views, FIGS. 2-6, inclusive, of the drawings. Although variation may be apparent to persons skilled in the art the following description constitutes a preferred sequence as presently contemplated.

FIG. 2 depicts the center mechanism 10 in a normal condition for receipt of an uncured tire band B. As shown, the uncured tire band B is being supported by its upper bead area by the shoe portion 22 of paddle members 21 of a loading apparatus 20. The loading apparatus 20 has vertically descended to a pre-determined extent after being brought into axial alignment with the center mechanism 10 such that the lower bead of the uncured tire band B reposes on the lower bead ring 30. The lower bead ring 30 is positioned in register with lower mold section 12 with the yoke 43 in the solid line position of FIG. 1. The cylinder 60 within cylinder casing 37 is at its uppermost position as depicted by the phantom lines position 60' depicted in FIG. 1 or spaced from the connector 65 the distance constituting the axial length of any spacer sleeve which may be positioned on the ledge 75 of the piston rod 56. The upper ring plate 50 and its clamp ring 51 which secure the upper bead of bag 25 have been positioned by axial adjustment of the rod clamp 57 such that the upper bead 27 of the bag 25 is substantially vertically aligned with respect to the upper bead of the uncured tire band B. As shown, a vacuum is drawn within the bag 25 to insure that it is retracted sufficiently to preclude interferring contact with the lower bead of the uncured tire band B as it is lowered to the position depicted in FIG. 2. The vacuum requirements are dictated by the thickness and composition of the bag 25. In the alternative, it is possible that the bag 25 may be fabricated of sufficiently thin material that it assumes a configuration comparable to that depicted in the phantom line position 25' in FIG. 2 in a non-pressurized state. Such a bag 25 would permit sufficient clearance for the lowering of an uncured tire band B thereover while possessing sufficient expansion characteristics upon the application of internal pressure to achieve the shaping and curing function hereinafter described.

Figure 3:
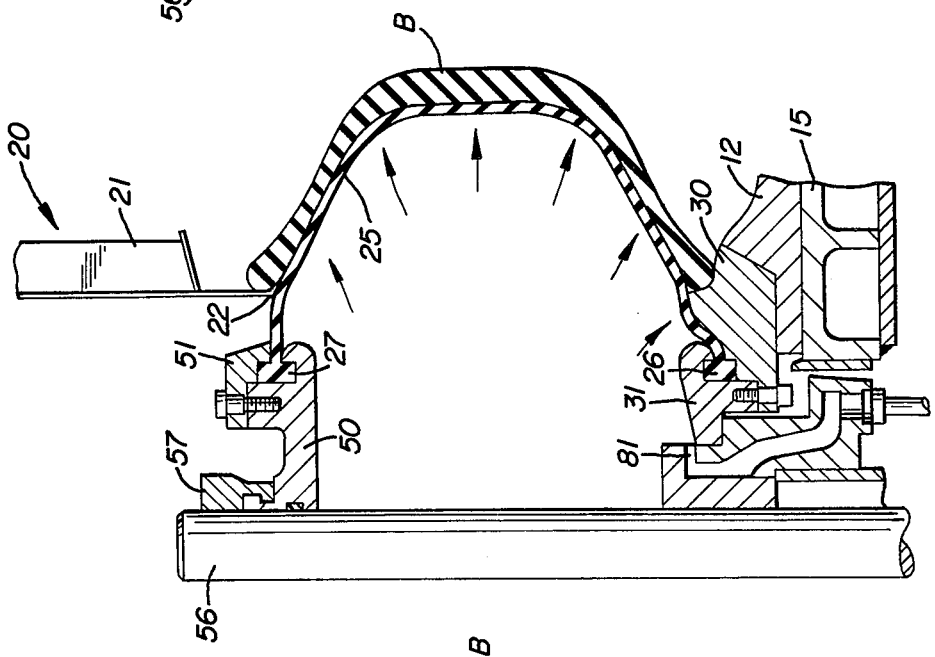
FIG. 3 is a view similar to FIG. 2 but representing the disposition of the center mechanism sequentially after the disposition depicted in FIG. 2 and with the bladder positioned within the uncured tire band and seated therein by virtue of the introduction of low pressure shaping fluid.

Turning now to FIG. 3 of the drawings, low pressure shaping fluid which is normally steam has been introduced through passages 80, 81 and the bag 25 has been deflected and/or expanded from one of the positions depicted in FIG. 2. It should be noted that shoe portions 22 of the loading apparatus 20 have been maintained in contact with the upper bead of the uncured tire band B in order to maintain the tire band in the substantially symmetrically suspended configuration depicted in FIG. 2 and maintained in FIG. 3. As thus positioned and with the bag 25 being symmetrical about a horizontal center line substantially accurate symmetrical bladder entry within the uncured tire band B is thus advantageously achieved, without substantial entrapment of air between the bag 25 and the uncured tire band B. The position of rod clamp 57 controlling the position of upper plate ring 50 along piston rod 56 may be adjusted to optimize these considerations depending upon the configuration and physical characteristics of both the bag 25 and the tire band B.

In the operational progression from FIG. 3 to that depicted in FIG. 4, the loading apparatus 20 has been removed from the upper bead of the uncured tire band B and displaced with respect to the center mechanism 10; and the press 11 has proceeded through its closing motion to the extent that the upper mold section 13 has been brought into contact with the upper bead of uncured tire band B and into interfitting engagement with the clamp ring 51 attached to upper plate ring 50. Once the arrangement depicted in FIG. 4 has been achieved an increased pressure shaping fluid may be introduced if desired.

The press continues to close from the position depicted in FIG. 4 to that depicted in FIG. 5. During this time, the piston 60 moves from the phantom line position 60' to the solid line position 60 depicted in FIG. 1. Upon reaching the condition depicted in FIG. 5 with the molds fully closed about the uncured tire band B, full curing pressure is applied through passages 80, 81 interiorly of the bag 25 which over a suitable time period effects full cure of the tire band in cooperation with the heat provided to the mold sections by the platens.

Once the curing cycle has been completed the high pressure curing fluid circulated within the bag 25 is promptly discontinued and the residual curing fluid is scavenged from the bag 25 as by the introduction of pressurized air or if a vacuum is to be employed as discussed in conjunction with FIG. 2 such could be introduced at that time. Thereafter the opening of the press commences thereby stripping the then cured tire T from the upper mold section and bead area. The lower bead ring 30 is actuated from its position in register with the lower mold section 12 of FIG. 5 to a vertically extended position depicted in FIG. 6 by actuating the cylinders 41 of the cylinder mechanism 35 (FIG. 1). Either contemporaneous with or subsequent to the vertical extension of the lower bead ring 30 the piston rod 56 is extended upwardly by the introduction of hydraulic fluid to the lower portion 37'' of cylinder casing 37 to move piston 60 from phantom line position 60' to the solid line position 60 (FIG. 1), such that as depicted in FIG. 6 the bag 25 returns to the FIG. 2 configuration. At any time after completion of the vertical upward extension of the lower bead ring 30 an unloading arm or other unloading device, schematically depicted at U in FIG. 6, may be positioned below the lower sidewall portion of the cured tire T. Thereafter, the lower bead ring 30 is actuated to move downwardly by actuation of cylinders 41 of cylinder mechanism 35. Whereupon, the lower bead of the cured tire T is stripped from lower bead ring 30, such that the cured tire T remains on the unloader U for discharge from the proximity of center mechanism 10 and subsequently the press 11. The lower bead ring 30 returns to its registry position with lower mold 12 as depicted in FIG. 2 at which time the center mechanism 10 is in all respects prepared for commencement of the processing cycle with respect to another uncured tire band which may be in the process of being positioned relative to center mechanism 10 as soon as cured tire T is discharged therefrom.

I claim:

1. A center mechanism for a press for shaping and curing tires comprising, post means carrying an upper bladder clamping ring, a lower bladder clamping ring through which said post means extends, bladder means having beads sealingly engaged by said upper and lower bladder clamping rings to form a chamber for curing medium, piston means carried by said post means, cylinder casing means including sealing means engaging said post means, said sealing means constituting spaced seals having a drain interposed therebetween, a first chamber in said cylinder casing means on one side of said sealing means communicating with the chamber formed in said diaphragm, a second chamber in said cylinder casing means on the other side of said sealing means in which said piston means is housed, and means for supplying fluid to the second chamber to control the position of said piston means therein while maintaining the fluid isolated from the curing medium.

2. Apparatus according to claim 1 wherein said post means has a ledge for supporting a spacer to limit the extent of travel of said piston means.

3. Apparatus according to claim 1 wherein said upper bladder clamping ring is adjustably secured axially of said post means by clamp means.

4. Apparatus according to claim 1 wherein said drain is in a ring and communicates with an annular groove surrounding said post means.

5. Apparatus according to claim 1 wherein said sealing means are housed in a connector joining two portions of said cylinder casing.

6. Apparatus according to claim 5 wherein said sealing means are positioned in glands extending into each of said portions of said cylinder casing.

7. Apparatus for positioning a diaphragm shaping mechanism relative to an uncured tire band delivered to a press by a loading mechanism including a center mechanism comprising, a lower bead ring means adapted to engage the lower bead of the uncured tire band, post means movable relative to said lower bead ring means, lower bladder clamping means attached to said lower bead ring means, upper bladder clamping means attached to said post means, bladder means having beads sealingly engaged by said upper and lower bladder clamping means, cylinder casing means housing piston means attached to said post means, a first fluid supply means providing curing medium to said bladder means and to a portion of said cylinder casing means to form a column of curing medium therein, and a second fluid supply means operating said piston means for moving said post means to position said upper bladder clamping means opposite the upper bead of the uncured tire band when supported on said lower bead ring means by the loading mechanism and when the press is closed a majority of the curing medium in said column being maintained in said portion of said cylinder casing means for separating the curing medium in said bladder means and said second fluid supply means.

8. Apparatus according to claim 7 wherein said lower bead ring means is vertically actuated by a cylinder lift assembly.

9. Apparatus according to claim 7 wherein the fluid operating said piston means in said cylinder casing means is separated by seals from the curing medium.

10. Apparatus according to claim 9 wherein said cylinder casing carries said lower bead ring means.

11. Apparatus according to claim 9 wherein said cylinder lift assembly includes a yoke attached to said cylinder casing means which is selectively moved by pistons.

12. Apparatus according to claim 11 wherein the pistons have rods on which spacers may be positioned to control the extent of travel of said yoke.

13. A center mechanism for a press for shaping and curing tires comprising, post means carrying an upper bladder clamping ring, a lower bladder clamping ring through which said post means extends, bladder means having beads sealingly engaged by said upper and lower bladder clamping rings to form a chamber for curing medium, piston means carried by said post means, cylinder casing means including sealing means engaging said post means, cap means on said cylinder casing means supporting said post means at a position displaced from said sealing means, a first chamber in said cylinder casing means on one side of said sealing means communicating with the chamber formed in said diaphragm, a second chamber in said cylinder casing means on the other side of said sealing means, said second chamber housing said piston means, and means for supplying fluid to the second chamber to control the position of said piston means therein while maintaining the fluid isolated from the curing medium.

14. Apparatus according to claim 13 wherein said cap means has a gland with a rider ring engaging said post means.

15. Apparatus according to claim 13 wherein said cap means is positioned proximate said lower bladder clamping ring.

* * * * *